Feb. 5, 1963     H. D. HARRIS     3,076,665

VEHICLE SUSPENSION

Filed Sept. 5, 1961

INVENTOR
Harold D. Harris

BY

ATTORNEY

3,076,665
VEHICLE SUSPENSION
Harold D. Harris, Lubbock, Tex., assignor to Harris and Thrush Manufacturing Co., Inc., Lubbock, Tex., a corporation of Texas
Filed Sept. 5, 1961, Ser. No. 136,005
3 Claims. (Cl. 280—112)

This invention relates to vehicle suspension and more particularly to spring arrangement for four wheeled agricultural trailers.

Most agricultural trailers do not have springs. The bed of the trailer is built directly onto the running gear and the only resilience is the natural resilience of the materials of construction together with the pneumatic tires.

One reason for the lack of springs is that often the trailers are towed over rough terrain with high unbalanced loads. Therefore, if an excessively resilient suspension is used, the trailer overturns easily.

On the other hand, the desirability of resilient suspension is obvious. Some of the advantages are that it makes the trailer easier to pull. When a trailer wheel strikes a rough place in the road it does not jerk back on the towing vehicle so much because of the resilience between the wheels and the load. Obviously, it cushions the load. A further advantage is that it removes strain from the various parts. The bed of these trailers will usually be a high box-like structure, and therefore rather rigid. However, as the trailer wheels go over uneven terrain, the running gear tends to flex, especially it will tend to twist about its diagonals.

An object of this invention is to provide springs for agricultural trailers.

Another object is to provide a resilient trailer suspension whereby the center of gravity of the load is kept as low as possible and also the clearance of the axle above ground is kept as high as possible.

A further object is to provide a plurality of individual units which are readily interchangable.

A further object is to provide an individual spring unit which is readily adapted to being placed and used with existing trailers.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawings, the different views of which are not necessarily to the same scale, in which.

Figure 1:
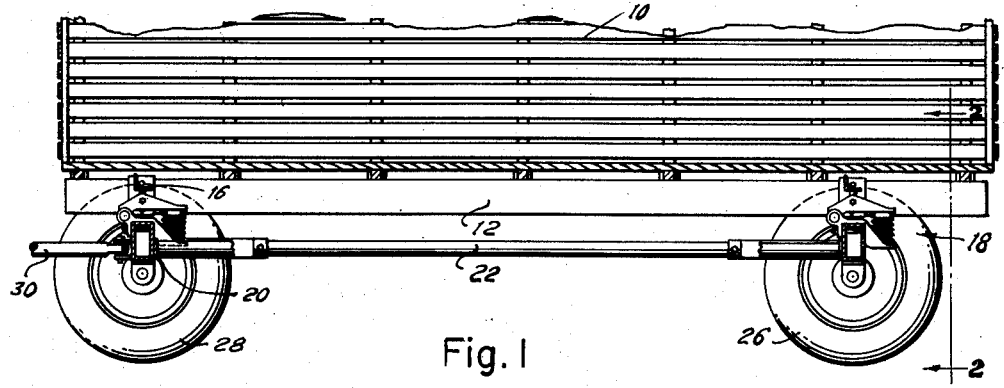
FIG. 1 is a longitudinal sectional view of a trailer with a spring suspension according to this invention.
Figure 2:
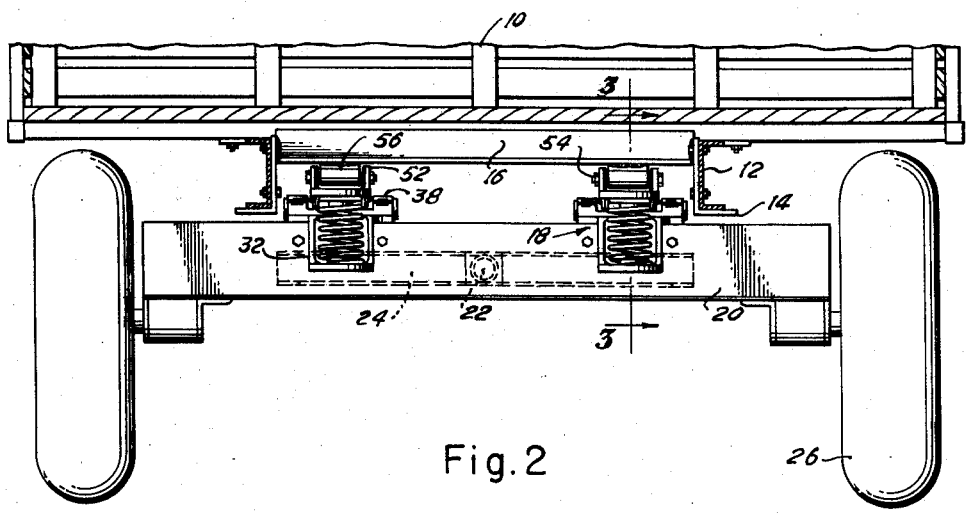
FIG. 2 is a sectional view taken on line 2—2 of FIG. 1.

As may be seen in the accompanying drawings, the spring units are to be mounted under a conventional farm trailer.

The farm trailer includes bed 10, which has the customary sideboards, front gate, end gate, and floor boards supported by cross bars. The cross bars rest upon runners 12 which run longitudinally of the trailer. The runners 12 are supported by bolster stakes 14 which themselves depend from each end of bolsters 16 which are supported by my new spring units 18 on axles 20. It will be noted that for this purpose the front and rear axles are similar and therefore, all of the spring units 18 are identical. The front and rear axles 20 are held in proper relationship by reach pole 22 and the axles are held in proper angular relationship by hounds 24. Rear wheels 26 are mounted for rotation upon the rear axle 20.

Front wheels 28 are mounted for rotation on the front axle 20 and also are mounted so that they may be turned about pivots at the ends of the front axle and thus guide the trailer by the tongue 30.

Each spring unit 18 includes lower spring holder 32 and upper spring holder 34. These are pivoted together by pivot shaft 36, which passes through loops 38 on the lower spring holder 32 on either side thereof and forward of area 40 which is on top of the axle 20. Saddle 42 of the upper spring holder 34 is welded to the pivot shaft 36 between the two loops 38.

Figure 3:
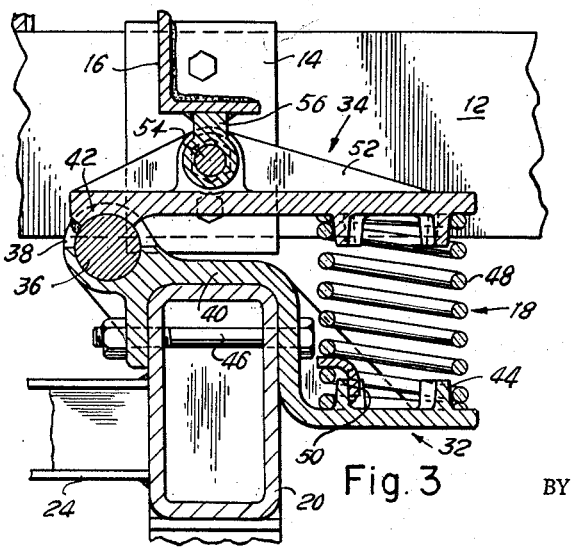
FIG. 3 is a sectional view of one spring unit taken on line 3—3 of FIG. 2.

The lower spring holder 32 has spring retainers 44 which are located on that portion of lower spring holder which lies rearward of the axle 20. The retaining lugs 44 are well below the top of the axle 20. Flange portions of the lower spring holder 32 fits snugly on either side of the axle 20 and have holes therethrough by which bolts 46 (only one showing in FIG. 3) pass through these holes and through the axle 20, thus securely attaching the lower spring holder 32 to the axle.

Helical or coil spring 48 rests upon the lower spring holder 32 and is maintained in proper position by these retaining lugs 44. To prevent the spring 48 from becoming detached from the lower spring holder, spur 50 is welded to one of the retaining lugs 44 and extends over at least one of the coils of the spring 48.

The upper spring holder 34 is relatively flat. Flanges 52 run longitudinally on either side thereof for additional strength. These flanges 52 have holes therethrough which are reinforced by bosses. Pin 54 is journaled through the holes in the flanges 52. Bearing 56 surrounds the pin 54 between the two flanges. The bearing 56 is welded to the underside of the bolster 16.

It will be noted that the pin 54 is between that area of the upper spring holder 34 whereon the spring 48 bears and the pivot 36. Therefore, relative movement of the bolster 16 toward the axle 20 will cause even greater movement of the spring 48. Therefore, spring 48 need not be as stiff as if the movement of the spring were the same as the movement of the bolster toward the axles. This permits the use of less expensive springs because the more flexible springs are less expensive. Furthermore it will be noted that this requires the very slight clearance of the runner 12 above the axle 20. This is desirable because it keeps the center of gravity of a loaded trailer low and also permits the axle 20 to be high. A low center of gravity makes the trailer more difficult to overturn while a high axle 20 gives the trailer better clearance over rough terrain. It will be noted that if the coil spring 48 were placed above the axle 20 there would hardly be clearance for it between it and the floor board of the trailer bed 10, much less for the other supporting structures needed. Another advantage will be noted that as the bolster stakes depend from the end of the bolster 16 that they are relatively close to the axle 20. Therefore, this limits the movement of the bed of the trailer relative to the axle. Excessive movement is not needed because these are generally rather stoutly sprung and a great deal of resilient suspension is not necessary.

As seen in the drawings, on each spring unit 18 the pivot shaft 36 and pin 54 are parallel to each other and axle 20 and therefore transverse of the trailer.

It will be noted that the embodiment shown is only exemplary and that various modifications can be made in construction, materials, and arrangement within the scope of the invention as defined in the appended claims.

I claim as my invention:
1. A spring unit for agricultural trailers comprising:
   (a) a lower spring holder adapted to be attached to an axle of the trailer,
   (b) the lower spring holder having an area adapted to rest on top the axle,

(c) a coil spring,
(d) the spring resting on an area of the lower spring holder which is lower than the area adapted to rest on top the axle,
(e) a spur attached to the lower spring holder and extending over at least one of the coils of the spring to hold the spring on the lower spring holder,
(f) an upper spring holder,
(g) the upper spring holder having two longitudinal flanges,
(h) a pin extending between the flanges,
(i) a bearing on the pin adapted to be attached to a bolster of the trailer,
(j) loops on one of the spring holders,
(k) a pivot shaft extending through the loops, and mounted for rotation therein, and
(l) a saddle on the other of the spring holders,
(m) the saddle welded to the pivot shaft between the loops,
(n) the spring bearing against an area of the upper spring holder,
(o) the pin in the upper spring holder between the spring bearing area and the pivot shaft, so arranged and constructed that the movement of the spring is greater than the movement of the pin.

2. An agricultural trailer comprising:
(a) a front axle,
(b) two wheels attached to the front axle,
(c) a rear axle,
(d) two wheels attached to the rear axle,
(e) a reach pole connected to the axles,
(f) a tongue attached to the front axle,
(g) two bolsters, one above each axle,
(h) two runners extending longitudinally of the trailer,
(i) four bolster stakes, one depending from each end of each bolster,
(j) each runner attached to two of the bolster stakes,
(k) a bed mounted on the runners,
(l) four spring units, two between each axle and bolster,
(m) each spring unit including a lower spring holder
(n) attached to one of said axles,
(o) an upper spring holder
(p) pivoted to one of said bolsters, and
(q) a pivot shaft pivotally connecting the upper and lower spring holders together, and
(r) a coil spring between the two spring holders,
(s) the bolster pivoted to the upper spring holder between the pivot shaft and the coil spring,
(t) each of the pivot shafts and axes of the pivots of the bolster to the spring holder is parallel to the axles.

3. An agricultural trailer comprising:
(a) a front axle,
(b) two wheels attached to the front axle,
(c) a rear axle,
(d) two wheels attached to the rear axle,
(e) a reach pole connected to the axles,
(f) a tongue attached to the front axle,
(g) two bolsters, one above each axle,
(h) two runners extending longitudinally out of the trailer,
(i) four bolster stakes, one depending from each end of each bolster,
(j) each runner attached to two of the bolster stakes,
(k) a bed mounted on the runners,
(l) four spring units, two between each axle and bolster,
(m) each spring unit including a lower spring holder attached to one of the axles of the trailer,
(n) a coil spring,
(o) the coil spring resting on an area of the lower spring holder which is lower than the top of said axle,
(p) a spur attached to the lower spring holder and extending over at least one of the coils of the spring to hold the spring on the lower spring holder,
(q) an upper spring holder,
(r) the upper spring holder having two longitudinal flanges,
(s) a pin extending between the flanges,
(t) a bearing on the pin attached to one of said bolsters of the trailer,
(u) loops on one of the spring holders,
(v) a pivot shaft extending through the loops and mounted for rotation therein, and
(w) a saddle on the other spring holder,
(x) the saddle welded to the pivot shaft between the loops,
(y) the spring bearing against an area of the upper spring holder, the pin in the upper spring holder between the spring bearing area and the pivot shaft, so arranged and constructed that the movement of the spring is greater than the movement of the pin.

References Cited in the file of this patent
UNITED STATES PATENTS 1,653,580    Mayer    Dec. 20, 1927
1,748,976    Davis    Mar. 4, 1930